(12) United States Patent
Etienne et al.

(10) Patent No.: US 9,989,692 B2
(45) Date of Patent: Jun. 5, 2018

(54) METHODS AND APPARATUS FOR PROVIDING IMPROVED DISPLAY COMPONENTS

(71) Applicant: CORNING INCORPORATED, Corning, NY (US)

(72) Inventors: Michael Etienne, Corning, NY (US); Richard Curwood Peterson, Elmira Heights, NY (US); Vasudha Ravichandran, Painted Post, NY (US); Kathleen Ann Wexell, Corning, NY (US)

(73) Assignee: Corning Incorporated, Corning, NY (US)

( * ) Notice: Subject to any disclaimer, the term of this patent is extended or adjusted under 35 U.S.C. 154(b) by 341 days.

(21) Appl. No.: 14/433,193

(22) PCT Filed: Oct. 7, 2013

(86) PCT No.: PCT/US2013/063622
§ 371 (c)(1),
(2) Date: Apr. 2, 2015

(87) PCT Pub. No.: WO2014/058748
PCT Pub. Date: Apr. 17, 2014

(65) Prior Publication Data
US 2015/0277023 A1    Oct. 1, 2015

Related U.S. Application Data

(60) Provisional application No. 61/710,975, filed on Oct. 8, 2012.

(51) Int. Cl.
*F21V 8/00* (2006.01)
*G02B 5/02* (2006.01)
(Continued)

(52) U.S. Cl.
CPC ............ *G02B 6/0043* (2013.01); *C03C 15/00* (2013.01); *G02B 5/0221* (2013.01);
(Continued)

(58) Field of Classification Search
CPC ... G02B 5/0221; G02B 5/0268; G02B 6/0043
(Continued)

(56) References Cited

U.S. PATENT DOCUMENTS

| 4,377,723 A | 3/1983 | Dalal |
| 5,091,053 A | 2/1992 | Blonder et al. |

(Continued)

FOREIGN PATENT DOCUMENTS

| CN | 1540418 A | 10/2004 |
| CN | 200976053 Y | 11/2007 |

(Continued)

OTHER PUBLICATIONS

International Search Report and Written Opinion, dated Jan. 17, 2014, pp. 1-12, International Application No. PCT/US2013/063622, International Filing Date Oct. 7, 2013, Korean Intellectual Property Office, Metropolitan City, Republic of Korea.
(Continued)

*Primary Examiner* — Toan Ly
(74) *Attorney, Agent, or Firm* — Ryan T. Hardee (57) ABSTRACT

Methods and apparatus for providing one or more components for a display system, particularly for producing diffused light.

6 Claims, 9 Drawing Sheets

(51) Int. Cl.
*C03C 15/00* (2006.01)
*G02F 1/1335* (2006.01)

(52) U.S. Cl.
CPC ......... *G02B 5/0231* (2013.01); *G02B 5/0268* (2013.01); *G02B 6/0025* (2013.01); *G02B 6/0065* (2013.01); *G02F 1/133606* (2013.01); *G02F 1/133615* (2013.01)

(58) Field of Classification Search
USPC .......................................................... 362/613
See application file for complete search history.

(56) References Cited

U.S. PATENT DOCUMENTS

| | | | |
|---|---|---|---|
| 7,052,627 | B1 | 5/2006 | Kezuka et al. |
| 7,291,386 | B2 | 11/2007 | Richter et al. |
| 8,547,639 | B2 | 10/2013 | Watanabe et al. |
| 8,787,717 | B2 | 7/2014 | Logunov |
| 8,798,425 | B2 | 8/2014 | Bita et al. |
| 9,093,003 | B2 | 7/2015 | Logunov et al. |
| 9,217,826 | B2 | 12/2015 | Logunov et al. |
| 2001/0035713 | A1 | 11/2001 | Kimura |
| 2008/0304004 | A1* | 12/2008 | Amako ................. B32B 38/145 349/201 |
| 2009/0274873 | A1* | 11/2009 | Shinotsuka ............ B82Y 10/00 428/143 |
| 2010/0103350 | A1 | 4/2010 | Arai et al. |
| 2010/0245321 | A1 | 9/2010 | Ogita et al. |
| 2011/0043892 | A1 | 2/2011 | Smith et al. |
| 2011/0051047 | A1* | 3/2011 | O'Neill ................ G02B 6/0096 349/67 |
| 2011/0170036 | A1 | 7/2011 | Ishikawa et al. |
| 2011/0194167 | A1 | 8/2011 | Jackson et al. |
| 2011/0267697 | A1 | 11/2011 | Kohli et al. |
| 2011/0281068 | A1 | 11/2011 | David et al. |
| 2012/0064228 | A1 | 3/2012 | Kitamura et al. |
| 2012/0112224 | A1 | 5/2012 | Le Bellac et al. |
| 2012/0218640 | A1 | 8/2012 | Gollier et al. |
| 2013/0050992 | A1* | 2/2013 | Schneider ............. F25D 23/028 362/100 |

FOREIGN PATENT DOCUMENTS

| | | | |
|---|---|---|---|
| CN | 101560058 | A | 10/2009 |
| JP | 08334608 | A | 12/1996 |
| JP | 2004325907 | | 11/2004 |
| JP | 2005283895 | A | 10/2005 |
| JP | 2005338427 | | 12/2005 |
| JP | 2006145587 | A | 6/2006 |
| JP | 2009009825 | A | 1/2009 |
| JP | 4307137 | | 8/2009 |
| JP | 2013182600 | | 9/2013 |
| KR | 10-2011-0110240 | | 10/2011 |
| TW | 201027193 | A | 7/2010 |
| TW | 201133078 | A | 10/2011 |
| TW | 201236991 | A | 9/2012 |
| WO | WO 2011032135 | A2 * | 3/2011 ........... G02B 5/0221 |
| WO | 2011065446 | A1 | 6/2011 |
| WO | WO 2012-073426 | | 4/2012 |
| WO | 2012058084 | | 5/2012 |
| WO | 2012124323 | | 9/2012 |

OTHER PUBLICATIONS

Barboux, et al., Paradoxical crystalline morphology of frosted glass; *Journal of Non-Crystalline Solids*, vols. 345 & 346 (2004), pp. 137-141.
English Translation of CN201380063678.8 Third Office Action dated Jan. 30, 2018; 14 Pages; Chinese Patent Office.
Zhang; "TV Principle and Receiver"; Aug. 30, 2010 p. 202-203.
European Patent Application No. 13845839.3 Office Action dated Apr. 17, 2018; 8 Pages; European Patent Office.

\* cited by examiner

| 6-1 | 6-2 | 6-3 | 6-4 | 6-5 | 6-6 | 6-7 | 6-8 |
|---|---|---|---|---|---|---|---|
| 1 to 1 | 30s | 4 | 22 | 32 | 97 | 2.3 | 8 |
| 1 to 1 | 45s | 11 | 56 | 73 | 212 | 1.6 | 5 |
| 1 to 1 | 1min | 23 | 101 | 114 | 297 | 0.7 | 2 |
| 1 to 1 | 2min | 58 | 144 | 178 | 535 | -0.8 | 3 |
| 1 to 1 | 3min | 62 | 113 | 152 | 362 | -1.5 | 7 |
| 1 to 1 | 4min | 62 | 92 | 115 | 312 | -0.6 | 4 |
| 1 to 1 | 5min | 62 | 91 | 114 | 311 | -0.6 | 4 |
| 1 to 1 | 6min | 64 | 97 | 122 | 329 | -0.6 | 4 |
| 1 to 1 | 7min | 65 | 113 | 159 | 377 | 1.3 | 3 |
| 1 to 1 | 8min | 69 | 141 | 176 | 474 | -0.7 | 3 |
| 1 to 1 | 9min | 74 | 165 | 203 | 566 | -0.6 | 3 |
| 1 to 1 | 10min | 78 | 193 | 232 | 682 | -0.8 | 3 |
| 1 to 1 | 15min | 82 | 239 | 289 | 865 | 0.3 | 2 |
| 9 to 1 | 30s | 2 | 4 | 5 | 13 | -0.9 | 4 |
| 9 to 1 | 45s | 1 | 3 | 4 | 12 | -0.9 | 5 |
| 9 to 1 | 1min | 2 | 3 | 4 | 10 | -0.8 | 4 |
| 9 to 1 | 2min | 2 | 3 | 4 | 10 | -0.8 | 4 |
| 9 to 1 | 3min | 2 | 3 | 4 | 11 | -0.6 | 5 |
| 9 to 1 | 4min | 1 | 3 | 4 | 10 | 0.0 | 4 |
| 9 to 1 | 5min | 2 | 3 | 4 | 12 | 0.0 | 4 |
| 9 to 1 | 6min | 1 | 3 | 4 | 11 | 0.0 | 4 |
| 9 to 1 | 7min | 1 | 3 | 4 | 11 | -0.1 | 4 |
| 9 to 1 | 8min | 1 | 3 | 3 | 10 | -0.2 | 4 |
| 9 to 1 | 9min | 1 | 3 | 4 | 13 | -0.3 | 4 |
| 9 to 1 | 10min | 1 | 4 | 5 | 13 | -0.3 | 4 |
| 9 to 1 | 15min | 1 | 4 | 6 | 15 | -0.7 | 5 |

METHODS AND APPARATUS FOR PROVIDING IMPROVED DISPLAY COMPONENTS

CROSS REFERENCES

This application is co-pending with and claims the benefit of priority under 35 U.S.C. § 371 of International Application Number PCT/US13/63622 filed on Oct. 7, 2013 which claims the priority benefit under 35 U.S.C § 119 of U.S. Provisional Application No. 61/710,975 filed on Oct. 8, 2012, the content of each are incorporated herein by reference in their entirety.

FIELD OF THE DISCLOSURE

The present disclosure relates to methods and apparatus for providing one or more components for a display system, particularly for producing diffused light.

BACKGROUND

Conventional components used to produce diffused light have included diffusive glass, which has been employed in a number of applications in the display industry. These applications include bezel-free television systems, liquid crystal displays (LCDs), electrophoretic displays (EPD), organic light emitting diode displays (OLEDs), plasma display panels (PDPs), micro-electromechanical structures (MEMS) displays, electronic reader (e-reader) devices, and others.

It has been discovered, however, that commercially available diffusive glasses do not meet certain new and important requirements for the emerging display industry.

The desire for the compounding effects of thinner, lighter and more energy efficient displays has led to the development of so-called transflective displays. Transflective displays are for the most part translucent (semi-transparent), and are being commercially implemented in several venues. Notable applications of transflective displays (which may also be referred to herein as translucent displays) include vending machine doors, freezer doors, retail advertising, augmented reality screens, heads-up displays in the automotive industry, smart windows for offices, portable consumer electronics, and security monitoring.

Translucent displays, however, are susceptible to some poor performance characteristics. Conventional translucent displays incorporate both a transmissive medium and a reflective medium giving the display the versatility of being used both indoors and outdoors. The resulting "transflective medium" may include openings-on-metal, a half-mirror metal sheet, a multilayer dielectric film, orthogonal polarization transflectors, etc. Independent of the implementation, however, these so-called transflective displays suffer from a number of shortcomings. Indeed, since such displays only partially transmit and reflect light, the contrast ratio of the display is greatly limited. For example, commercially available translucent displays offer only about 15% transmission, and the performance is even lower in reflection. In an indoor setting, conventional transflective displays not only suffer from low illumination, but the reflective component reflects too much of the ambient scenery and ultimately distorts the principal information to be displayed. Additionally, color rendering is challenging since the image is mixed with the natural transparent color of the display.

For most practical applications, a translucent display requires the support of backplane illumination (via a transparent backlight element). In order to maintain translucency, the backlight needs to be fully transparent in an OFF-state and fully illuminated in an ON-state. Additionally, the use of a transparent backlight supersedes the use of the conventional reflective medium, and therefore by eliminating the reflective medium, both image brightness and image quality can be vastly improved.

It has been discovered, however, that existing technology for providing sources of backplane illumination, are not satisfactory in meeting certain cost and performance requirements of the marketplace.

SUMMARY

Transparent Backplane

In accordance with one or more embodiments, a novel mask-less etching technique produces diffusive glass structures, which may be used in any number of applications, including as a backplane in translucent display applications. The methodology involves a low cost, highly controllable process for producing a light scattering portion that includes nanometer-size random features in and/or on a surface of a glass substrate. The light scattering portion tremendously improves the light scattering properties of the resulting diffusive glass structure. In operation, light is introduced into, and propagates in a waveguide fashion within, the glass substrate and is incident on the light scattering portion. In response, the light scatters out of the diffusive glass structure in accordance with desirable optical characteristics.

The methodologies contemplated herein involve a wet chemical etching process for texturing the glass substrate for illumination applications and articles made by that process, such as the aforementioned translucent display applications. The chemical etch process includes etching the glass substrate in an etch bath that comprises a mixture of glacial acetic acid (GAA) and about a 40% aqueous mixture of ammonium fluoride (NH4F). The resulting diffusive glass structure is a textured flat glass substrate, where the glass material may be Code 2318, Eagle XG, soda-lime glass, etc., all available from Corning, Inc. For illumination applications, the textured glass substrate may be optimized by controlling parameters of the process, such as the composition of the etchants and the etching time.

Display System with Transparent Backplane

In accordance with one or more embodiments herein, methods and apparatus have been developed to produce a diffusive glass structure as a backplane for a display system.

Conventional translucent display systems, such as translucent (semi-transparent) LCD televisions are commercially available for digital signage and advertising applications. These display systems are semi-transparent in the OFF-state (i.e., when no image is being commanded by the associated electronics driving the LCD elements). In order to maintain the semi-transparent characteristics, these conventional display systems do not employ an opaque optical backplane in order to produce light to excite the LCDs. Instead, the display systems use background, ambient light to excite the LCDs in the ON-state (i.e., when the associated electronics is commanding an image). Thus, one can see through the display system and view objects (such as merchandise, etc.) behind the display screen. Concurrently, the viewer can also receive visual information on certain portions of the screen (or the entire screen), which in a commercial application would likely be related to the merchandise behind the screen.

A significant issue with the semi-transparent display systems, however, is that they are not particularly transparent.

In fact, measurements have shown that they exhibit only about a 15% transmission ratio. Thus, one must often provide a relatively high level of ambient light in proximity to the screen, which might not always be feasible or even desirable for any number of reasons. The result is an array of problems in terms of uniformity of image quality across the display, such as non-uniformity in color, contrast ratio, etc.

Thus, in accordance with one or more further embodiments herein, a transparent backplane is provided for a transparent display system. The transparent backplane is formed using some or all of the components discussed above in connection with the diffusive glass structure. The diffusive glass structure is placed behind the translucent display system, and light is introduced into the glass sheet along one or more edges thereof, and/or along one or more borders thereof. The light propagates in a waveguide fashion within the glass sheet and is incident on the light scattering portion. Thus, the light scatters out of the transparent backplane and illuminates the LCDs of the translucent display system. The transparent backplane therefore improves the light source for the LCD elements of the translucent display system. The scattering elements are produced in order to provide suitable light wavelength(s) and angle independent excitation of the LCDs. In addition, the scattering elements produce a suitable haze ratio, which is low enough so as to achieve a high level of transparency of the backplane (one can visually see through it) when portions of the display system are in the OFF-state.

The advantages listed below pertain both to the diffusive glass structure (such as a transparent backplane) and/or the process used to make such structure.

In use as a transparent backlight, the diffusive glass structure will provide critical additional lighting to increase the brightness, functionality and the viewing angle of a transparent display.

The addition of a transparent backlight will eliminate the need for the reflective medium in the translucent display (which eliminates a major disadvantage of reflective-type displays). The translucent display may therefore work solely in transmission, thereby eliminating any image distortion from glare and reflection. Another advantage to eliminating the reflective medium is in maintaining vastly improved (approaching perfect) color balance. When using a conventional transflective element, the reflected beam travels twice through the color filter while the transmitted beam only passes once, resulting in color imbalance between the R-mode and the T-mode. By working in transmission-only mode, the translucent display will have better image rendering quality. Further, even if a designer maintains a reflective medium in the translucent display, in the presence of the illumination by the transparent backlight, the transmitted light overpowers the reflected light, thereby rendering the any reflection of ambient light invisible to the viewer.

Still further, in use as a transparent backlight, the diffusive glass structure will provide improvements in color fidelity through tuning the injected light into the diffusive glass structure. When such tuning includes selecting color(s) to mix with the natural color shade of the translucent display, the color fidelity of the display is improved. Additionally, in one or more further embodiments, the light injection may be adaptive (by tuning the light injecting sources, e.g., controlling LEDs of different colors) to enhance scene colors based on instantaneous color content.

The primary advantage of the etching approach for making textured glass is that it only requires wet solutions using chemicals that are commonly available in industrial quantities, which significantly lowers the cost of the process compared with other techniques, such as abrasive etch, etched particles, and/or etching cream processes. The solutions required for the novel etching technique also do not include the common, but very hazardous, hydrofluoric acid component, which results in a much safer etch mixture for production. The process results in a narrow distribution of lateral feature sizes as compared with some other processes, such as the aforementioned etch creams.

In architectural applications, the diffusive glass structure may be employed for both indoor and outdoor lighting. For example, the transparent backplane may be used as a skylight, where the textured glass would be relatively unaffected by weather conditions. The advantages of use as a skylight include more resistance to discoloration from weathering, the ability to provide artificial light (not simply channel sunlight) in low lighting conditions, such as at night to provide additional lighting.

Still further, the process for producing the diffusive glass structure is compatible with both pre and post-process ion-exchange treatments. The use of chemically strengthened glass through ion exchange may be used to provide protection for other delicate structures, such as the LCD sheet in a translucent display.

Compared to other techniques, the resulting illumination using the diffusive glass structure made according to the novel process is very uniform, light transmission is high, and there is no theoretical limitation in the size of the substrate that can be prepared.

In use as a transparent backplane, the resulting diffusive glass structure also exhibits increased brightness, maintaining transparency (in the OFF-state), improved light uniformity, improved light wavelength and incidence angle, improved color coordinates, and relatively simple and cost-effective input optics.

Other aspects, features, and advantages of the embodiments of the present disclosure will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the embodiments are not limited to the precise arrangements and instrumentalities shown.

DETAILED DESCRIPTION OF THE EMBODIMENTS

With reference to the drawings wherein like numerals indicate like elements there are shown in the figures a number of features and methodologies suitable to use in connection providing various optical components for one or more display systems.

Light Diffusing Structure

Figure 1:
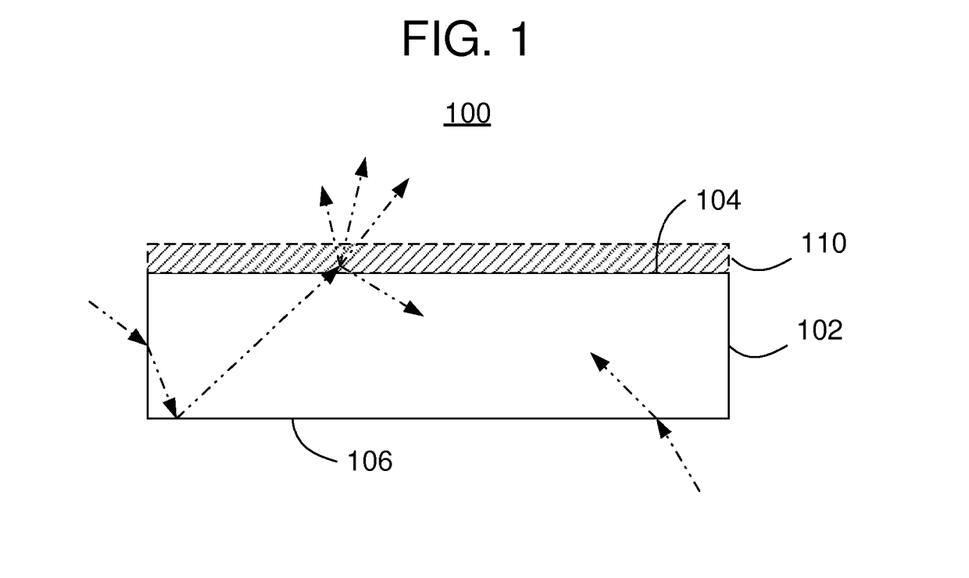
FIG. 1 is a side-sectional view of a light diffusing structure in accordance with one or more embodiments herein.
Figure 2:
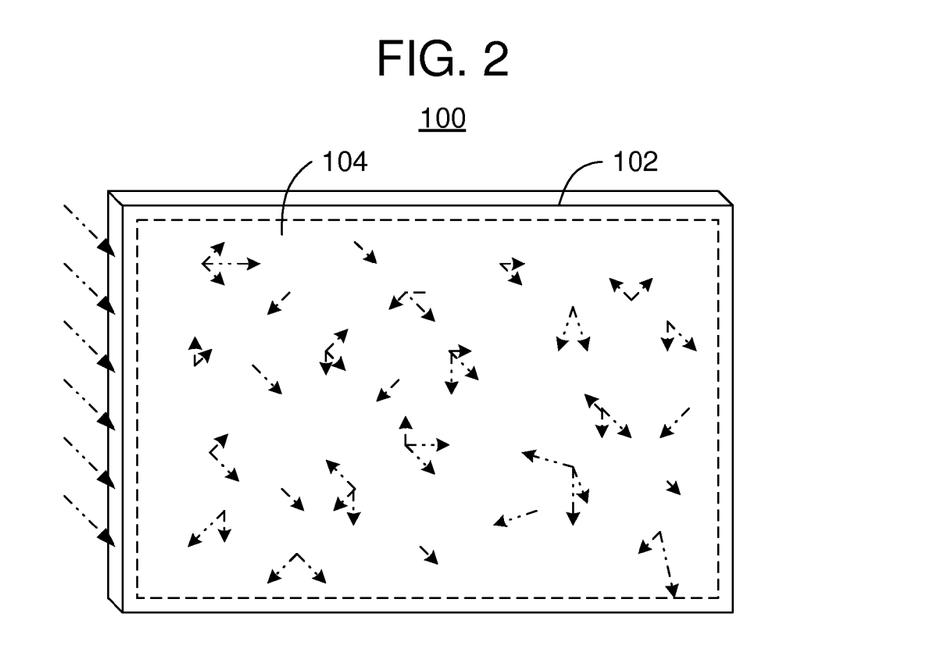
FIG. 2 is a front elevational view of the light diffusing apparatus of FIG. 1.

With reference to FIGS. 1-2, a diffusing apparatus 100 in accordance with one or more embodiments herein may be employed to process light for a display system or other application. In general, the diffusing apparatus 100 operates to receive light from one or more edges or borders of the structure, propagate the light within a glass structure and diffuse and scatter the light out a front of the structure (as illustrated by the arrows in FIG. 2) for useful purposes.

The diffusing apparatus 100 includes a glass substrate (or sheet) 102 having first and second spaced apart, planar surfaces 104, 106. Any suitable commercially available glass sheet may be employed that can withstand the processing parameters expressly or inherently disclosed later herein. The diffusing apparatus 100 also includes at least one scattering layer having a plurality of sub-micron sized (e.g., nanometer sized), preferably randomly located, light scattering elements 110 (which may be considered a light scattering layer) disposed on and/or in the first surface 104 of the glass sheet 102.

As illustrated by the dashed arrows, light may enter the glass sheet 102 and begin propagating therethrough until the rays of light impinge upon the scattering elements 110. Given the optical properties of the glass sheet 102 and the scattering elements 110, the light scatters out of the diffusing apparatus 100. The optical characteristics are generally of the surface scattering variety or volumetric scattering variety (depending on the depth of the scattering layer 110) and will be controllable via the process for producing the scattering elements 110.

It has been found that the sizes of the plurality of light scattering elements 110 will affect the light scattering properties of the diffusing apparatus 100. In particular, relatively small sized elements 110 scatter backwards as well as forwards, and particles of about 150 nm and larger scatter predominately forward, which is generally desirable in the diffusing apparatus 100. Indeed, scattering in predominantly the forward direction facilitates high transmission ratios and suitable haze ratios in the apparatus 100. More particularly, the general dimensions of the elements 110 should be on the order of about 200 nm in order to achieve a high transmission ratio. Indeed, as smaller feature sizes of the elements 110 tend to backscatter the light, the resultant transmission ratio would be adversely affected. Elements 110 of a size greater than about 500 nm scatter light forward, but the angular spread is small, which is less desirable. Given the above optical scattering characteristics as a function of scattering element size, the approximate feature size the scattering elements 110 may be one of: (i) between about 100 nm to about 500 nm, (ii) between about 200 nm to about 300 nm, and (iii) about 250 nm.

The optical light scattering characteristics of the diffusing apparatus 100 are also affected by the respective refractive indices of the glass sheet 102, the scattering elements 110, and in some embodiments discussed later herein, an over-coating material. The glass sheet 102 (and the optional over-coating material) will likely have refractive indices on the order of about 1.4-1.6.

Methodology for Producing Diffusing Apparatus

Reference is now made to FIGS. 3 and 4A, 4B, and 4C, the former being a flow chart illustrating process flow/steps in connection with producing the diffusing apparatus 100 (and variants thereof), and the latter trio being high level schematic diagrams of intermediate structures that further illustrate the methodologies associated with producing the diffusing apparatus 100.

At action(s) 302, the glass sheet 102 is processed to make it ready for the etching stage. In particular, the glass sheet 102 may be ground and polished to achieve a desirable thickness and/or flatness and/or otherwise sized, and thereafter cleaned and washed (See FIG. 3 and FIG. 4A). Next, at action(s) 304, the surface 106 of the glass sheet 102, which is not to be etched, is laminated (preferably over the entire surface) with a protective film 106A that resists or prevents etching (see FIG. 3 and FIG. 4A). Next, at action(s) 306, at least the surface 104 of the glass sheet 102, which is to be etched, is subject to a process for removing contamination, such as adsorbed organic contamination. Such process may include exposing the surface 104 to ozone by placing the structure a UV ozone generator.

Figure 3:
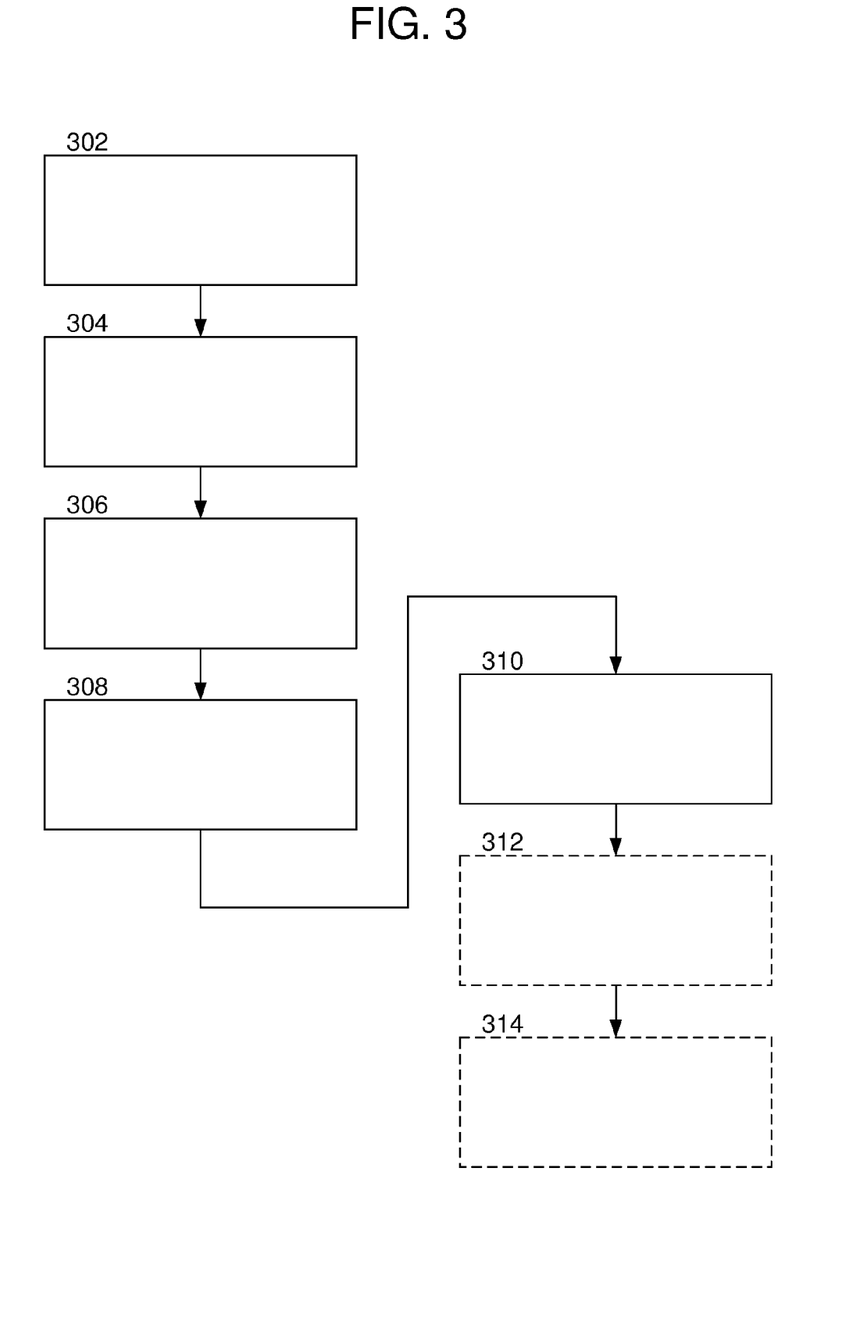
FIG. 3 is a flowchart illustrating process steps that may be carried out to produce the light diffusing apparatus of FIG. 1.
Figure 4A:
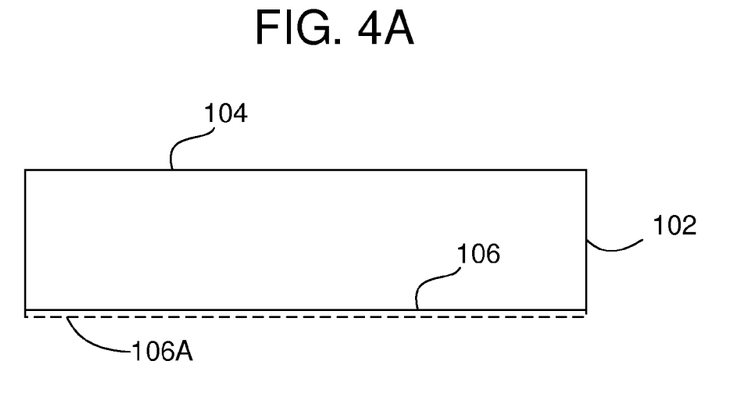
FIGS. 4A, 4B, and 4C are side sectional views of intermediate structures further illustrating the process of producing the light diffusing apparatus of FIG. 1.
Figure 4B:
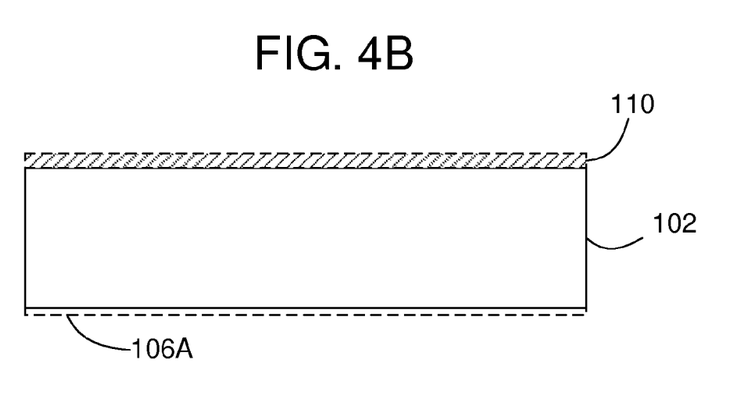

Next, at action(s) 308, the surface 104 of the glass sheet 102 is subject to etching by exposing same to an etch bath comprising a mixture of glacial acetic acid (GAA) and ammonium fluoride (NH4F) in one or more ratios (see FIG. 3 and FIG. 4B). For example, the etch bath may be defined as a mixture ratio of the glacial acetic acid (GAA) and a concentration percentage of the ammonium fluoride (NH4F). The mixture ratio may be between about 1:1 to 9:1, and the concentration percentage of the ammonium fluoride (NH4F) may be between about 20%-50%, with 40% be preferred. The etch time may range between about 30 seconds and about 15 minutes, although other times may be employed if such yield desirable results, and the temperature may be room temperature or some elevated temperature. Again, the etch time and temperature will have an effect on the feature size, shapes, and distribution of the resulting scattering elements 110. Indeed, the etching composition, the etching time, and the etching temperature are key process variables that drive the resulting surface texture of the etched glass sheet 102.

At action(s) 310, at least the surface 104 of the glass sheet 102 (which now includes the scattering elements or layer 110) is subject to a rinsing process to remove undesired remnants of the materials introduced during the etching process, such as rinsing in de-ionized water.

As an optional step, the glass sheet 102 may be subject to an ion exchange process at action(s) 312. If such a process is desired, then the process would of course begin with preparing a glass sheet 102 that is capable of ion exchange. For example, ion-exchangeable glasses that are suitable for use in the embodiments herein include alkali aluminosilicate glasses or alkali aluminoborosilicate glasses, though other glass compositions are contemplated. As used herein, being capable of ion exchange means that a glass is capable of exchanging cations located at or near the surface of the glass sheet 102 with cations of the same valence that are either larger or smaller in size.

The ion exchange process is carried out by immersion of the glass sheet 102 into a molten salt bath for a predetermined period of time, where ions within the glass sheet at or near the surface thereof are exchanged for larger metal ions, for example, from the salt bath. By way of example, the molten salt bath may include potassium nitrate (KNO3), the temperature of the molten salt bath may within the range of about 400-500 ° C., and the predetermined time period may be within the range of about 4-24 hours, and preferably between about 4-10 hours. The incorporation of the larger ions into the glass sheet 102 strengthens the sheet by creating a compressive stress in a near surface region. A corresponding tensile stress is induced within a central region of the glass sheet 102 to balance the compressive stress.

By way of further example, sodium ions within the glass sheet 102 may be replaced by potassium ions from the molten salt bath, though other alkali metal ions having a larger atomic radius, such as rubidium or cesium, may replace smaller alkali metal ions in the glass. According to particular embodiments, smaller alkali metal ions in the glass sheet 102 may be replaced by Ag+ ions. Similarly, other alkali metal salts such as, but not limited to, sulfates, halides, and the like may be used in the ion exchange process. The replacement of smaller ions by larger ions at a temperature below that at which the glass network can relax produces a distribution of ions across the surface of the glass sheet 102 that results in a stress profile. The larger volume of the incoming ion produces a compressive stress (CS) on the surface and tension (central tension, or CT) in the center region of the glass sheet 102.

Figure 4C:
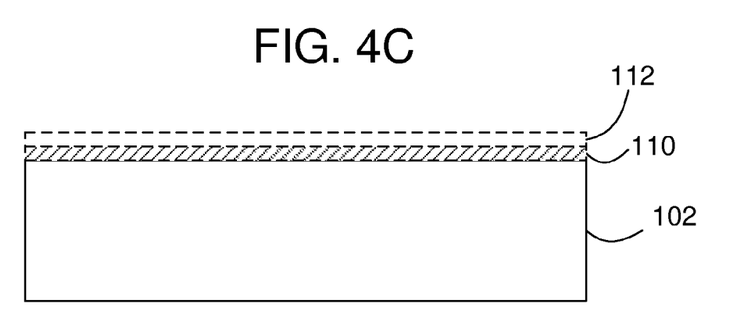

At action(s) 314, an additional option may involve a coating process in which the glass sheet 102 is coated with a hardening resin 112 and cured (see FIG. 3 and FIG. 4C). Although any number of resins may be employed, one suitable resin is Accuglass T-111, which may be obtained from Honeywell Corp. The resin may be diluted to some fraction of its full concentration to facilitate application to the surface of the glass sheet 102 via a spray nozzle. The thickness of the coating 112 may be controlled by varying a traverse speed of the spray nozzle, characterized by a rate of mm/min. The glass sheet 102 and applied resin coating 112 may then be cured at an elevated temperature to harden the resin.

Examples and Measurements

In connection with anticipating the performance characteristics of the light diffusing structure 100, a number of simple metrics have been considered noteworthy, such as maximum light extraction efficiency, minimum light attenuation, maximum clarity, and maximum transparency. In order to meet these metrics, the aforementioned etching process may be adapted by varying one or more process parameters, such as mixture ratio, concentration percentage, etch time, etch temperature, application of ion exchange, application of coatings, etc. In this regard, a number of experiments were conducted, which are presented below.

A number of trials were conducted using a series of pieces of ion exchangeable glass sheets 102, including Corning® Gorilla Glass® (Code 2318) from Corning, Inc., Eagle XG glass from Corning, Inc., and Guardian Ultrawhite glass. The glass sheets 102 were either received or cut to sizes ranging from about 2"×2" to about 2.5"×2.5". The Guardian Ultrawhite glass samples were ground and polished to about 1.1 mm in thickness, while the Code 2318 samples were sized to about 0.7 mm in thickness, and the Eagle XG samples were sized to about 0.5 mm thick.

The glass sheets 102 were first cleaned (either internally or as-received from the supplier). Next, the samples were laminated to protect one surface (e.g., surface 106) from being etched. After lamination, the glass sheets 102 were placed in a UV/ozone cleaner to remove adsorbed organic contamination from the surface of the glass sheet 102 to be etched (e.g., surface 104). Next, the etching procedure was carried out on the glass sheets 102 using the wet etch bath comprising a mixture ratio of GAA and 40% ammonium fluoride (NH4F). The mixture ratio was varied from sample-to-sample from about 1:1 to 9:1 for the Code 2318 glass sheets 102. The etch times were also varied from about 30 seconds to about 15 minutes. Next, the samples were rinsed in DI water and blown dry.

Figure 5A:
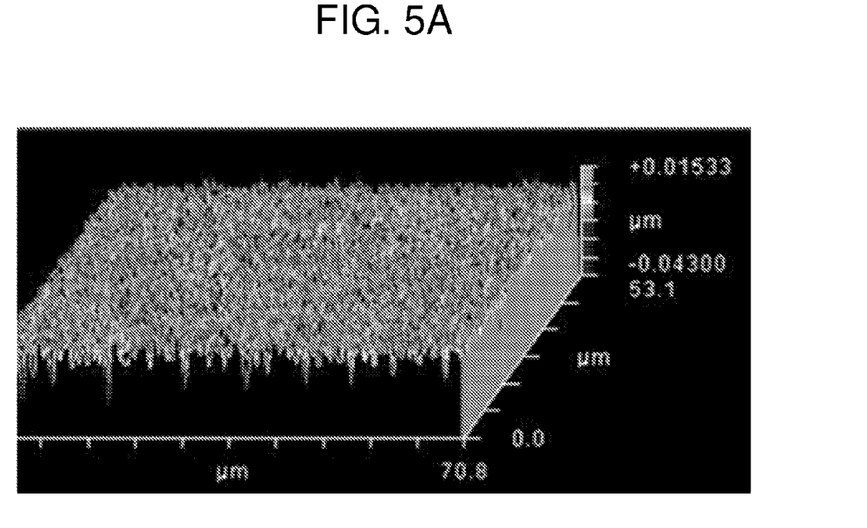
FIGS. 5A-5B are respective images of light scattering elements etched into the surface of the light diffusing apparatus, with each image showing the results of differing etching conditions.
Figure 5B:
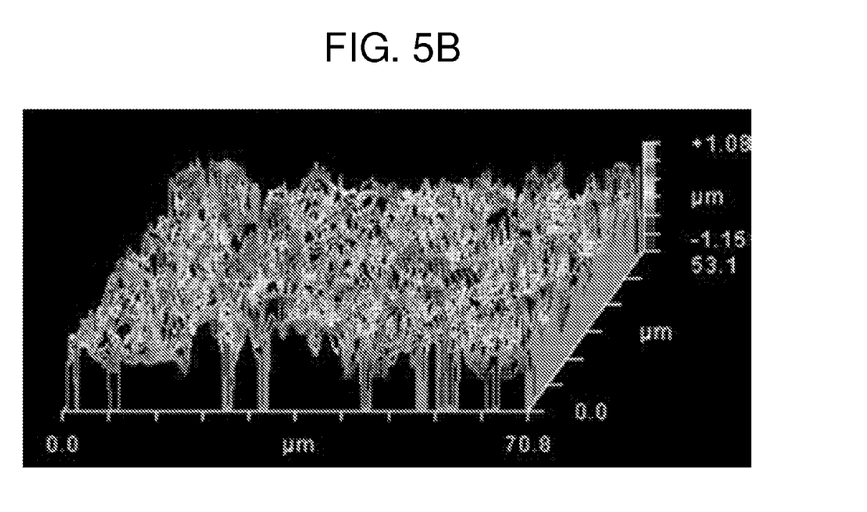

The samples were then imaged with a microscope, after which, the surface texture was measured by using a Zygo NewView™ model 7300 white light optical profilometer. FIG. 5A illustrates the surface texture profile of one Code 2318 glass sheet 102 having been etched at a first extreme of mixture ratio and etch time (i.e., a 9:1 mixture ratio at 30 seconds). FIG. 5B illustrates the surface texture profile of another Code 2318 glass sheet 102 having been etched at a second extreme of mixture ratio and etch time (i.e., a 1:1 mixture ratio at 15 minutes). It is apparent from the results that longer etch times using higher etchant mixture ratios produce deeper, coarser features, and shorter etch times with lower etchant mixture ratios produce shallower, finer features.

Following etching, at least some samples were subject to an ion exchange process (described above).

Figure 6:
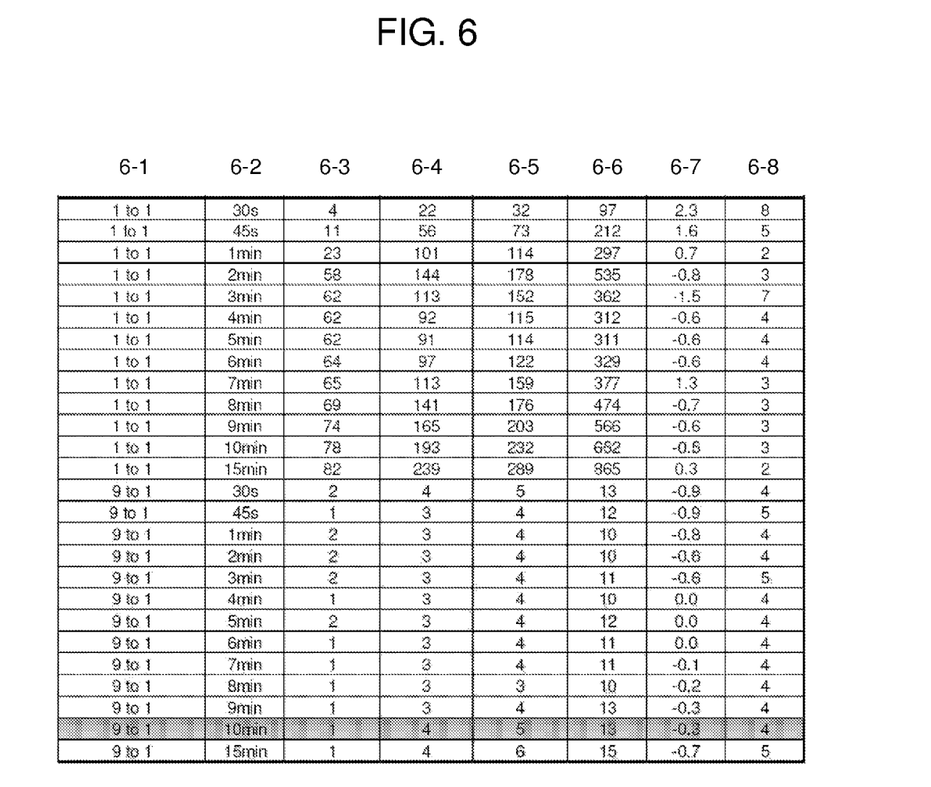
FIG. 6 is a table listing numerous optical characteristics of light scattering elements etched into the surface of a number of light diffusing apparatus samples that were subject to differing production conditions.

With reference to FIG. 6, an important attribute of the etching process is the ability to tune the surface texture features using the etch mixture ratio and etching time. FIG. 6 is a table summarizing the surface texture attributes of Code 2318 glass sheets 102 subject to varying conditions. Each row in the table represents a given sample of glass sheet. The respective columns are: (i) the ratio of glacial acetic acid-to-40% ammonium fluoride (6-1); (ii) etch time (6-2); (iii) transmitted haze in percent (6-3); (iv) roughness average, Ra, measured in nm (6-4); (v) RMS roughness, Rq, measured in nm (6-5); (vi) height, H, measured in nm (6-6); (vii) skewness, R, represented as an index (6-7); and (viii) kurtosis represented as an index (6-8). Measurements were carried out using the aforementioned Zygo NewView 7300 optical profilometer (using microscope settings of 20× lens and 2× zoom). The low and high filter wavelengths were 0.5 micron and 50 microns respectively. Roughness average Ra, RMS roughness Rq, skewness and kurtosis defined the characteristics of the surface elements 110 of the samples. Ra is the mean height of the surface profile. Rq is the RMS mean Rq is more sensitive to peaks and valleys than Ra, because the amplitudes are squared. Rsk is the skewness of the height distribution of the surface features. If Rsk is less than 0, it can be a surface with valleys and if Rsk is greater than 0 it can be a flat surface with peaks. Values numerically greater than 1.0 may indicate extreme valleys or peaks on the surface. Rku is the kurtosis of the height distribution. Kurtosis is a measure of the randomness of heights, and of the sharpness of a surface. Surfaces with a kurtosis of 3 represent a random surface. kurtosis lower than 3 implies a less random surface. A perfectly random surface has a value of 3; the farther the result is from 3, the less random and more repetitive the surface. Surfaces with spikes are higher values; bumpy surfaces are lower.

It was found that samples etched for 10 minutes using a 1:1 mixture ratio resulted in a surface with an RMS roughness 232 nm, skewness of −0.5 and a kurtosis of 3. This indicates a surface with randomly spaced valleys. In contrast, samples etched for 10 minutes using a 9:1 mixture ratio resulted in a surface with an RMS roughness of 4 nm, skewness of −0.3, and a kurtosis of 4, which is surface with randomly spaced valleys, but with lower amplitude. The main difference between these two results is in the transmitted haze; indeed, the samples etched for 10 minutes using the 1:1 mixture ratio result in a haze of about 78%, while samples etched for 10 minutes using the 9:1 mixture ratio result in a haze of about 1%. The former haze level may be unacceptable for some display applications, and the latter is a low haze that is suitable in many display applications.

The lateral spacing and feature depth of the etched glass sheets 102 were driven primarily by the mixture ratio of the acetic acid and ammonium fluoride. Indeed, further testing of etchant mixture ratios was conducted, specifically ranging from of one part acetic acid to one part 40% ammonium fluoride to fifteen parts acetic acid to one part 40% ammonium fluoride. The best light scattering performance was measured in samples etched using an acetic acid to 40% ammonium fluoride mixture ratio of 9:1 for a duration of 10 minutes.

Figure 7:
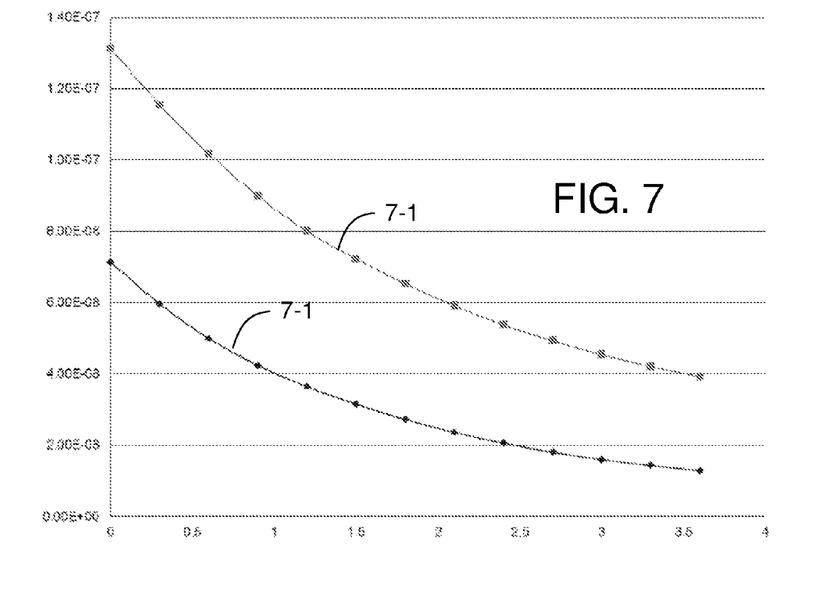
FIG. 7 is a graph of the light scattering characteristics of the light scattering elements etched into the surface of two light diffusing apparatus samples, one having been subject to an ion exchange process.

With reference to FIG. 7, light scattering tests of etched samples with, and without, ion exchange were carried out. The plot of FIG. 7 includes measured power (in watts) on the Y-axis and distance (in cm) on the X-axis. The plots for samples without ion exchange (7-1) and with ion exchange (7-2) reveal that the ion exchange process increased the light scattering effect of the etched light diffusing structure 100. It is believed that the modified ion exchanged layer 110 shows a slightly higher refractive index which helps waveguide the light longer into the glass sheet 102, and therefore the light interacts with the rough surface for a longer time, increasing overall brightness.

Figure 8:
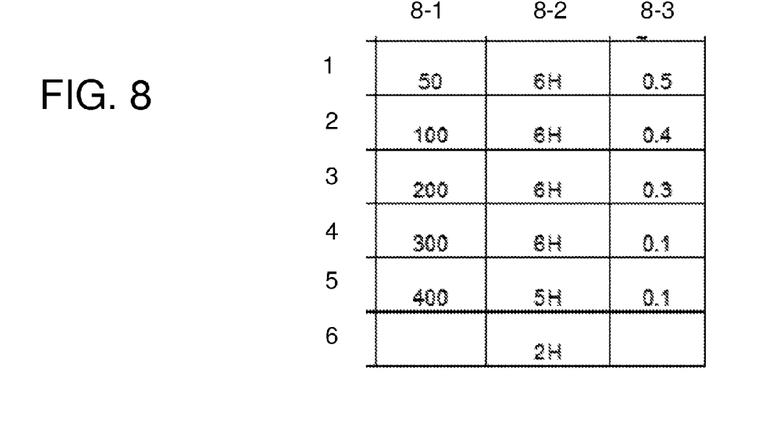
FIG. 8 is a table of the surface hardness characteristics of the light scattering layer of a number of light diffusing apparatus samples that were subject to differing production conditions.

With reference to FIG. 8, scratch resistance is also a desirable property of the textured surface of the glass sheet 102. The table shown in FIG. 8 includes respective rows of the samples 1-5 and control 6, and columns for traverse speed 8-1 (measured in mm/min), pencil hardness (expressed in units of H), and coat weight (measured in g/m^2). A pencil hardness test was used as an index of the scratch resistance of the textured surface 110. For reference, the pencil hardness scale is as follows: 9 H, 8 H, . . . 2 H, H, F, HB, B, 2 B, . . . 8 B, 9 B. Where 9 H indicates the highest hardness scratch resistance and 9 B indicates the lowest scratch resistance. It may be desirable for the textured glass surface 110 to have a hardness of at least about 2 H. The pencil hardness of Code 2318 glass sheets 102 after the etching process was tested to be 2 H.

In order to increase the scratch resistance, some samples were over coated (as discussed above concerning FIGS. 3 and 4C) with a hardening resin and cured. In particular, a number of samples were sprayed with Accuglass T-111 resin diluted to 25% of the full concentration. The thickness of the coating layer 112 was controlled by varying the traverse speed of the spray nozzle between 50 mm/min and 400 mm/min. The samples were then cured at 540° C. for 20 min. FIG. 8 shows the effect of the coating 112 on the scratch resistance of the textured surface 110. The thinnest coating applied was at the highest nozzle velocity of 400 ram/min, as reflected by lowest coat weight of 0.1 g/sq. m. The pencil hardness of the resultant surface without any coating was 2 H. Even the thinnest coating applied at a traverse speed of 400 mm/min improved the pencil hardness from 2 H to 5 H. Further increases in coating thickness by slowing down nozzle speed and increasing the coating deposition rate did not result in further increases in pencil hardness.

Figure 9:
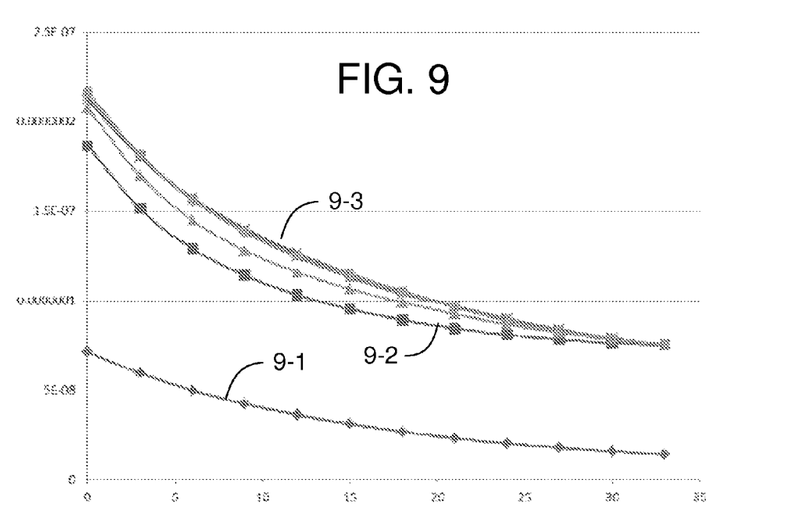
FIG. 9 is a graph of the light scattering characteristics of light scattering elements etched into the surface of a number of light diffusing apparatus samples that were coated using differing coating parameters.

In addition, the application of a thin coating of Accuglass T-111 resulted in an enhanced light scattering effect as seen in FIG. 9. In particular, the plots of FIG. 9 include measured power (in watts) on the Y-axis and distance (in cm) on the X-axis. The plots for samples include a sample without ion exchange (9-1), and ion exchange samples with varying thickness coatings, ranging from 50 mm/min (9-2) through 400 mm/min (9-3).

Light Diffusing Apparatus and Display System

Figure 10:
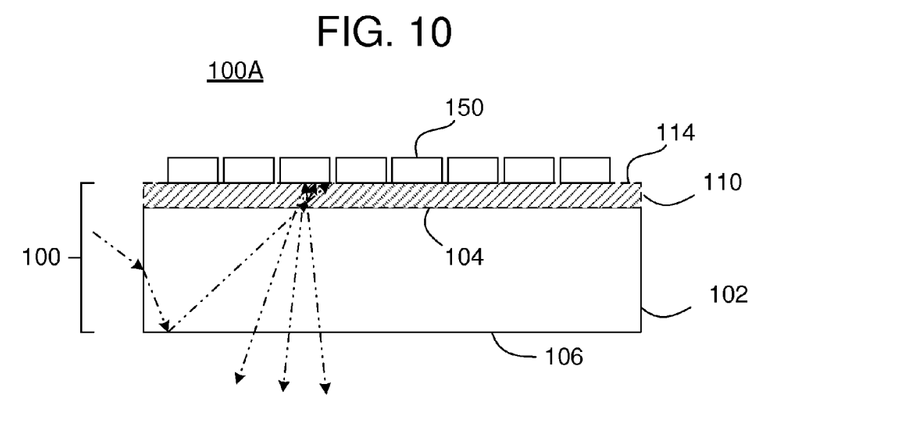
FIG. 10 is a side-sectional view of a display system employing a light diffusing apparatus and a plurality of electronic display elements in accordance with one or more embodiments herein.

Reference is now made to FIG. 10, which shows a side-sectional view of a display system 100A employing a light diffusing apparatus 100 and a plurality of electronic display elements. The display system 100A may employ any of the aforementioned aspects and/or features of the light diffusing apparatus 100 as a foundation on which a plurality of display components/elements 150 are disposed.

The glass sheet 102 provides a generally planar surface 106 directed towards a viewer of the display system 100A, and the opposing surface 104 on which the plurality of display components 150 are disposed. The collection of individual display components 150 define a large number of pixel sites for manipulating light in accordance with electronic control signaling in order to provide desirable display resolution to the viewer. By way of example, the display components 150 may be individual MEMS components, OLED components, or the like, arranged in an array.

The light diffusing apparatus 100 provides a light diffusing characteristic, such that any light entering the glass sheet 102 from one or more edges, borders, and/or from the viewing surface 106 is diffused and scattered as it propagates toward the display elements 150. In addition, any light propagating back from the display components 150 will again be diffused as such light passes through the elements 110 on its way back to the viewer. Advantageously, such additional diffusion produces better angular emission of the light coming back from the display components 150 to the viewer.

The light diffusing apparatus 100 exhibits a suitably flat planarization surface 114 on which the array of display elements 150 are disposed, the light diffusing apparatus 100 provides a high haze ratio, a high transmission ratio, and desirable light scattering features (e.g., wide angular scattering).

Light Diffusing Apparatus with Light Source

Figure 11:
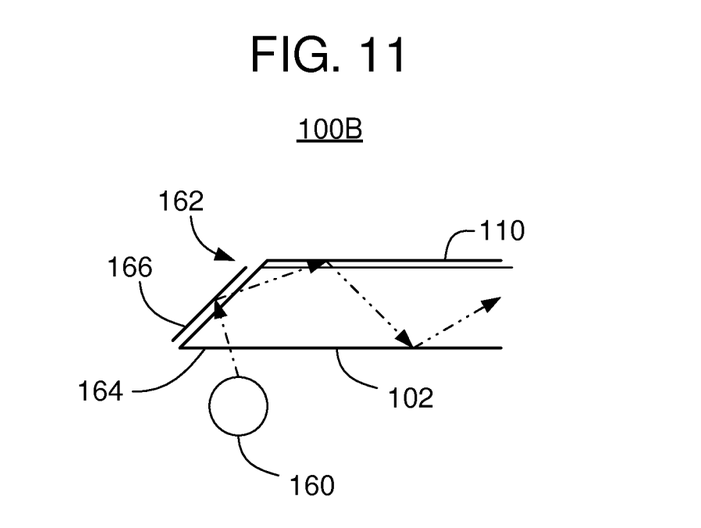
FIG. 11 is a partial schematic diagram of a portion of the light diffusing embodiments disclosed herein including a light source.
Figure 12:
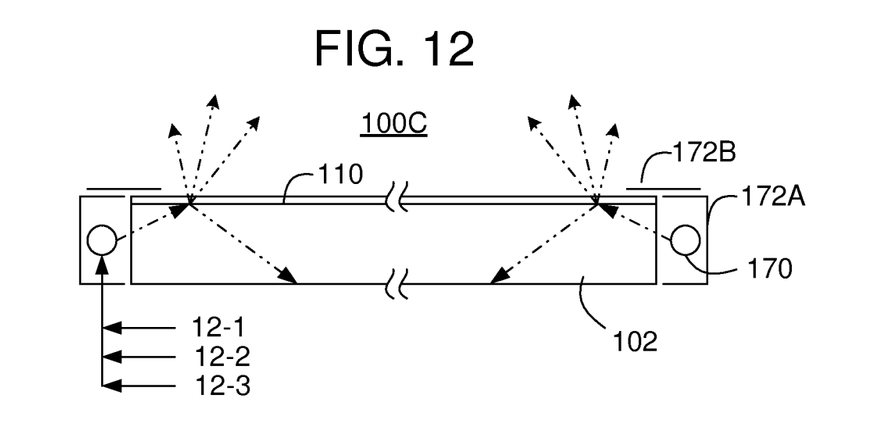
FIG. 12 is a side schematic view of the light diffusing embodiments disclosed herein including a fiber light source.

Reference is now made to FIGS. 11 and 12, which are schematic diagrams of the light diffusing embodiments disclosed herein including at least one light source. In either case, the embodiment may be employed with or without the display components 150 of FIG. 10.

FIG. 11 illustrates a light diffusing apparatus 100B, which includes a light source 160 disposed proximate to the glass (or plastic) sheet 102. The particular location of the light source 160 may be established such that light therefrom is coupled into the glass sheet 102, propagates within the glass sheet 102 in a waveguide mode, and at least a portion of light is diffused and scattered by the scattering layer. For example, the light source 160 may be one or a plurality of LEDs, or other suitable light generating elements, disposed along one or more edges 162 or one or more borders 164 of the glass sheet 102. In one or more embodiments, the one or more edges 162 of the glass sheet 102 may be beveled (and may include a metalized reflective surface 166). The bevel angle is chosen to redirect any light propagating within the glass sheet 102 in one or more directions that reduce the escape of light out of the at least one edge 162.

One or more alternative embodiments may employ one or more light sources and associated structures of the type(s) disclosed in U.S. Patent Application No. 61/407,698, filed Oct. 28, 2010, the entire disclosure of which is incorporated herein in its entirety.

FIG. 12 illustrates a light diffusing apparatus 100C, which includes at least one light diffusing fiber 170 extending along one or more edges of the glass sheet 102, and may optionally include a light redirecting or blocking border 172A, 172B to improve the optical appearance near the edges of the glass sheet 102. The light diffusing fiber 170 may be on the order of about 250-300 microns in diameter.

In a basic embodiment, one or more laser sources may produce white (or semi-white) light to couple into the fiber 170 and thereafter into the glass sheet 102 for diffusing. In one or more alternative embodiments, one or more laser sources, such as a red laser source (12-1), a green laser source (12-2) and/or a blue laser source (12-3), may couple light energy of differing wavelengths into a single fiber 170, or multiple fibers, in a way that couples such light into the glass sheet 102 and causes diffusion and scattering as discussed previously. Using multiple laser sources permits the production of any number of colors by adjusting the power level of each laser source.

Further details concerning various structures and methodologies associated with modulating the laser sources (e.g., time sequential modulation) to achieve desirable color image functionality and other details concerning the use of the fiber 170 may be found in: U.S. patent application Ser. No. 13/094,221, filed Apr. 26, 2011; U.S. Patent Application No. 61/545,713, filed Oct. 11, 2011; and; U.S. Patent Application No. 61/545,720, filed Oct. 11, 2011, the entire disclosures of which are incorporated herein by reference.

Display System with Transparent Backplane

Figure 13:
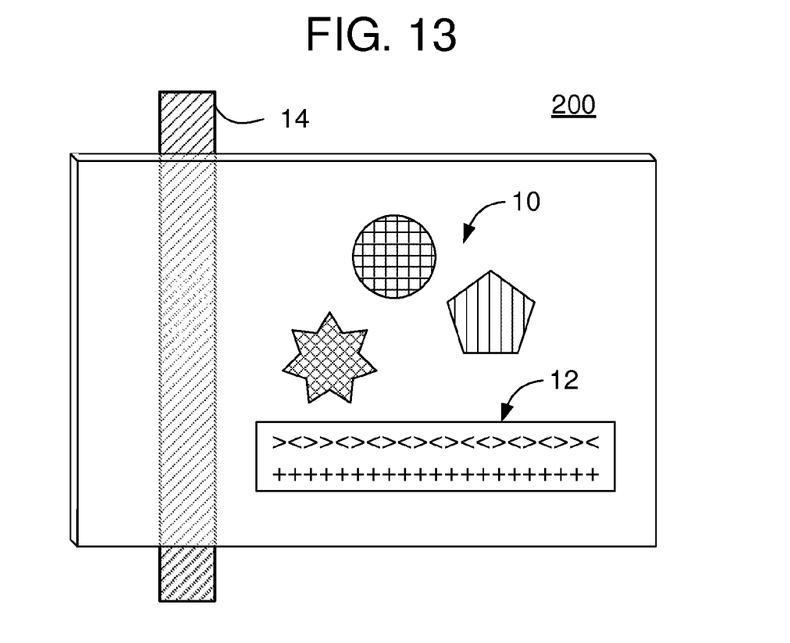
FIG. 13 is a schematic view of a display system employing a light diffusing component in accordance with one or more embodiments herein.
Figure 14:
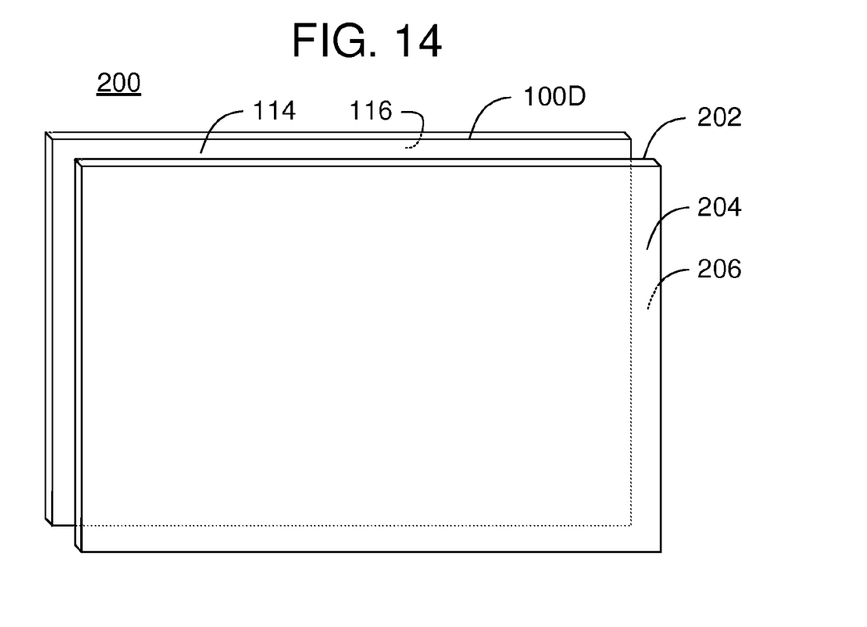
FIG. 14 is a schematic view of further details of the display system of FIG. 13.

With reference to FIGS. 13-14 and in accordance with one or more further embodiments herein, methods and apparatus have been developed to provide a backplane for a transparent or semi-transparent display system 200.

With reference to FIG. 13, the display system 200 operates to produce images 10, text 12, etc. on a display surface, which are viewable to a user. The display system 200 also exhibits transparent or semi-transparent characteristics such that one or more objects 14 behind the system 200 may be seen through the system 200, particularly (or possibly only) when no image is being commanded to exist in front of the object 14. In other words, the display system 200 is at least semi-transparent over one or more portions thereof when the associated display elements (e.g., LCD elements) in such portions are in an off-state. On the other hand, the same portions (or other portions) of the display system 200 may be semi-opaque or totally opaque when the associated display elements in such portions are in an on-state. Thus, one can see through the display system 200 and view the object 14 (such as merchandise, etc.) behind the display, while concurrently receiving visual information (images 10, 12, etc.) on certain portions of the display.

Turning to FIGS. 13-14, the display system 200 includes a display layer 202 having first and second spaced apart major sides 204, 206, and a plurality of display elements (not shown) disposed within (or on) the display layer 202 in an array and operating to produce the images 10, 12, in response to electrical signaling for viewing at (or from) the first major side 204. The display system 200 also includes a light diffusing backplane 100D, having first and second spaced apart major sides 114, 116 and operating to produce diffused light out of the first major side thereof 114. It is noted that the light diffusing backplane 100D may be implemented using any of the light diffusing embodiments expressly or inherently disclosed or suggested herein, particularly those employing one or more light sources 160 or light diffusing fibers 170 to couple light into the diffusing apparatus. The light diffusing backplane 100D is oriented such that the first major side 114 thereof is directed toward the second major side 206 of the display layer 202 such that the diffused light is a source of light for the plurality of display elements.

Although the disclosure herein has been characterized by reference to particular embodiments, it is to be understood that these embodiments are merely illustrative of the principles and applications of such embodiments. It is therefore to be understood that numerous modifications may be made to the illustrative embodiments and that other arrangements may be devised without departing from the spirit and scope of the combinations defined by the appended claims.

The invention claimed is:

1. An apparatus, comprising:
   a glass sheet having first and second spaced apart, planar surfaces;
   at least one scattering layer having a plurality of sub-micron sized light scattering elements etched into the first surface of the glass sheet; and
   a plurality of electronic display elements disposed on the scattering layer, each element operable to produce one or more pixelated portions of an image in response to one or more respective electronic command signals,
   wherein light entering the glass sheet from one or more edges, borders, and/or the second surface is coupled into the glass sheet, propagates within the glass sheet in a waveguide mode, and at least a portion of light is diffused and scattered by the scattering layer as such portion of light propagates towards the electronic display elements, and
   wherein light propagating back from the electronic display elements is diffused and scattered by the scattering layer, and propagates out the second surface of the glass sheet toward a viewer.

2. The apparatus of claim 1, wherein a feature size of the scattering elements is one of: (i) between 100 nm to 500 nm, (ii) between 200 nm to 300 nm, and (iii) 250 nm.

3. The apparatus of claim 1, further comprising a coating disposed on the first surface of the glass sheet covering the etched scattering elements.

4. The apparatus of claim 1, further comprising at least one light source disposed proximate to the glass sheet such that light therefrom is coupled into the glass sheet, propagates within the glass sheet in a waveguide mode, and at least a portion of light is diffused and scattered by the scattering layer.

5. The apparatus of claim 4, wherein the light source includes one or more light generating elements disposed along one or more edges or one or more borders of the glass sheet.

6. The apparatus of claim 1, further comprising at least one of:
- at least one light source disposed proximate to the glass sheet such that light therefrom is coupled into the glass sheet; and
- the at least one light source includes one or more light generating elements disposed along one or more edges or one or more borders of the glass sheet.

* * * * *